United States Patent
Dutertre

(10) Patent No.: US 7,246,232 B2
(45) Date of Patent: Jul. 17, 2007

(54) METHODS AND APPARATUS FOR SCALABLE DISTRIBUTED MANAGEMENT OF WIRELESS VIRTUAL PRIVATE NETWORKS

(75) Inventor: Bruno Dutertre, Mountain View, CA (US)

(73) Assignee: SRI International, Menlo Park, CA (US)

( * ) Notice: Subject to any disclaimer, the term of this patent is extended or adjusted under 35 U.S.C. 154(b) by 647 days.

(21) Appl. No.: 10/186,811

(22) Filed: Jun. 28, 2002

(65) Prior Publication Data
US 2003/0226013 A1     Dec. 4, 2003

Related U.S. Application Data

(60) Provisional application No. 60/384,662, filed on May 31, 2002.

(51) Int. Cl.
*H04L 9/00* (2006.01)
(52) U.S. Cl. .................. 713/163; 380/277; 713/151; 726/15
(58) Field of Classification Search ............. 713/163, 713/201, 151; 726/15; 380/277
See application file for complete search history.

(56) References Cited

U.S. PATENT DOCUMENTS

| | | |
|---|---|---|
| 5,666,415 A | 9/1997 | Kaufman |
| 5,729,608 A | 3/1998 | Janson et al. |
| 6,055,429 A | 4/2000 | Lynch |
| 6,079,020 A | 6/2000 | Liu |
| 6,092,200 A | 7/2000 | Muniyappa et al. |
| 6,195,751 B1 * | 2/2001 | Caronni et al. ............. 713/163 |
| 6,226,748 B1 | 5/2001 | Bots et al. |
| 6,263,437 B1 | 7/2001 | Liao et al. |
| 6,304,556 B1 * | 10/2001 | Haas .......................... 370/254 |
| 6,353,898 B1 | 3/2002 | Wipfel et al. |
| 6,456,599 B1 * | 9/2002 | Elliott ........................ 370/254 |
| 6,493,349 B1 | 12/2002 | Casey |
| 6,516,417 B1 | 2/2003 | Pengrum et al. |
| 6,662,221 B1 | 12/2003 | Gonda et al. |
| 6,671,724 B1 | 12/2003 | Pandya et al. |
| 6,711,400 B1 | 3/2004 | Aura |
| 6,711,409 B1 * | 3/2004 | Zavgren et al. ............. 455/445 |
| 6,775,772 B1 | 8/2004 | Binding et al. |
| 6,788,681 B1 | 9/2004 | Hurren et al. |
| 6,889,248 B1 | 5/2005 | Scheer |

OTHER PUBLICATIONS

L.R Dondeti et al□□Scalable secure one-to-many group communication using dual encryption□□2000□□Elsevier Science B.V□□1681-1701.*
Zygmunt J.Haas□□This is a Draft Version only□□Wireless Ad Hoc Networks□□1999□□1-28□□.*
Lidong Zhou□□Security Ad Hoc Networks□□Nov./Dec. 1999□□IEEE Network.*

(Continued)

*Primary Examiner*—Nasser Moazzami
*Assistant Examiner*—Fikremariam Yalew
(74) *Attorney, Agent, or Firm*—Deborah Neville

(57) ABSTRACT

An application of intrusion tolerant concepts to a software infrastructure for supporting secure group applications. This application is suited for use with network layer protocols such as TBRPF and is particularly adapted for wireless networks, and more specifically mobile ad hoc networks.

7 Claims, 10 Drawing Sheets

OTHER PUBLICATIONS

T. Kaya et al, Secure Multicast Groups on Ad Hoc Networks.*

Lakshmi et al, A Novel Authentication scheme for Ad hoc Networks, 2000 IEEE, 1268-1273.*

Yongguang Zhang, Wenke Lee, "Intrusion detection in wireless ad-hoc networks", Proc. 6th Annual International Conference on Mobile Computing and Networking, ACM Press, Aug. 2000. 275-283.

* cited by examiner

METHODS AND APPARATUS FOR SCALABLE DISTRIBUTED MANAGEMENT OF WIRELESS VIRTUAL PRIVATE NETWORKS

This application claims the benefit of U.S. application Ser. No. 09/844,693 filed Apr. 26, 2001 and U.S. provisional application No. 60/384,662 filed on May 31, 2002, incorporated by reference in its entirety.

GOVERNMENT FUNDING

The invention was made with Government support under contract Number N66001-00-C-8001 awarded by Space and Naval Warfare Systems Center. The Government has certain rights in this invention.

FIELD OF THE INVENTION

The field of the invention is secure groupware management. Also, the field of the invention is lightweight software or middleware for supporting secure group collaboration, fault-tolerance protocols, and cryptographic secret sharing. Moreover, the field of invention may further be described as that of low overhead link-state routing protocols.

BACKGROUND OF THE INVENTION

Small wireless handheld devices are becoming ubiquitous. Such devices offer new opportunities for forming lightweight collaborative ad hoc groups without the support of a fixed infrastructure. However, wireless communication is inherently more open to eavesdroppers and intruders than strictly wired networks. Currently, there is no means for secure dynamic group association in wireless multicast groups. Moreover, ad hoc network protocols have not addressed security considerations.

Any sufficiently complex computer system has vulnerabilities. Such vulnerabilities can be exploited by attackers who will be able to penetrate the system. Approaches such as secure protocols (SSL or Secure Socket Layer) perform only in the client server model and are not applicable to groups.

One typical approach to security for collaborative groups in networks is to use virtual private networks (VPNs). Such an approach is still difficult to successfully apply to mobile ad hoc networks, as current VPN technology requires fixed infrastructure such as firewalls and gateways.

Fault-tolerant protocols are known for authentication and key distribution but they rely on several authentication servers, some of which may be compromised. (L. Gong. Increasing Availability and Security of an Authentication Service. *IEEE Journal on Selected Areas in Communications*, 11(5):657-662, June 1993.) Whereas systems are known that may provide an authentication service to establish a secure point-to-point communications between two, the need for a secure service for a group rather than merely a pair remains a pressing problem to be solved.

Systems exist capable of providing secure group communication between distributed computers. These infrastructures provide group membership and multitasked services that support a variety of network level faults including network partitioning. Key agreement or key distribution protocols are implemented on top of these services, and cryptography ensures confidentiality and integrity of group communication. However, existing systems typically provide security against attacks on network traffic but do not provide intrusion tolerance. Moreover, these services have not yet been extended into a wireless network.

What is needed is an architecture that provides secure services in wireless networks. What is also needed is the essence of a VPN in a wireless network. Moreover, such a VPN is needed in mobile ad hoc networks. And such a secure communication system should tolerate some degree of intrusion while maintaining network stability.

SUMMARY OF THE INVENTION

The invention is directed towards systems and methods for managing secure collaborative network groups. The invention provides secure wireless virtual private networks. Further, the invention provides dynamic secure group management in wireless VPN. Also provided is a secure network communication method for collaborative networks. The inventive method further provides a means for dynamic creating groups of users and for dynamically managing group membership. The inventive method further provides means for group management, which include authentication of group, access control, and key generation and distribution. The invention also provides a wireless communication system wherein communicating modes are connected in such a manner such that a plurality of leaders share network management functions such that the resulting network communications are secure from unauthorized access.

Moreover invention provides a method of group authentication in collaborative networks having N leaders, wherein such authentication methods includes the steps of requesting session keys from the leader, response of the leader to the requesting member wherein said response includes a session key generated by the leader, and the result being that a secure channel is established between the leader and the requesting member for that session.

The invention provides operability on top of TBRPF routing protocol so as to support a secure collaborative group application in mobile ad hoc networks. The wireless Enclaves has a multi-leader architecture, where each leader runs on a wireless device. Other nodes (that are also wireless devices) can join a group by contacting and being authenticated by the leaders. Once in a group, each node communicates via multicast with all the other members of the group. The group communication is encrypted by a common group key that is generated and distributed by the leaders, and refreshed whenever the group composition changes. The leaders also distribute information about the current group membership, whenever a node joins or leaves the group; thus every member always knows the identity of the other members. Security (that is to say proper authentication of group members and confidentiality of communication) is preserved even if some of the leaders fail or are compromised. This is achieved via the use of Byzantine fault tolerant protocols and cryptographic secret sharing. The system can tolerate communication failure to some extent as a member does not need to keep in contact with all the leaders at all times.

Communication between group members as well as between members and leaders rely on TCP/IP protocols. Although other protocols may be used, TBRPF provides the necessary wireless routing and multicast protocols with the very low overhead ideal for mobile ad hoc networks.

DETAILED DESCRIPTION

For a brief illustration of TBRPF as it relates to this invention, please refer to Appendix A, and FIGS. 4 through E.

Enclaves[SM]1 Services

[1] Enclaves is used by Assignee, SRI, International to denotes proprietary software as described herein and set forth in A group-oriented application enables users to share information and collaborate via a communication network such as the Internet. Enclaves[SM] is a lightweight software infrastructure that provides security services for such applications. See Li Gong Enclaves: Enabling Secure Collaboration over the Internet; IEEE Journal in Selected Areas on Communications; 11, (5): 657-663, June 1993. Enclaves[SM] provides services for creating and managing groups of users of small to medium sizes, and enables the group members to communicate securely. Access to an active group is restricted to a set of users who must be pre-registered, but the group can be dynamic: authorized users can freely join, leave, and later rejoin an active application.

The communication service implements a secure multicast channel that ensures integrity and confidentiality of group communication. All messages originating from a group member are encrypted and delivered to all the other members of the group. For efficiency reasons, Enclaves[SM] provides best-effort multicast and does not guarantee that messages will be received, or received in the same order, by all members. This is consistent with the goal of supporting collaboration between human users, which does not require the same reliability guarantees as distributing data between servers or computers.

The group-management services perform user authentication, access control, and related functions such as key generation and distribution. All group members receive a common group key that is used for encrypting group communication. A new group key is generated and distributed every time the group composition changes, that is, whenever a user enters or leaves the group. Optionally, the group key can also be refreshed on a periodic basis. Enclaves also communicates membership information to all group members. On joining the group, a member is notified of the current group composition. Once in the group, each member is notified when a new user enters or a member leaves the group. Thus, all members know who is in possession of the current group key.

Figure 5:
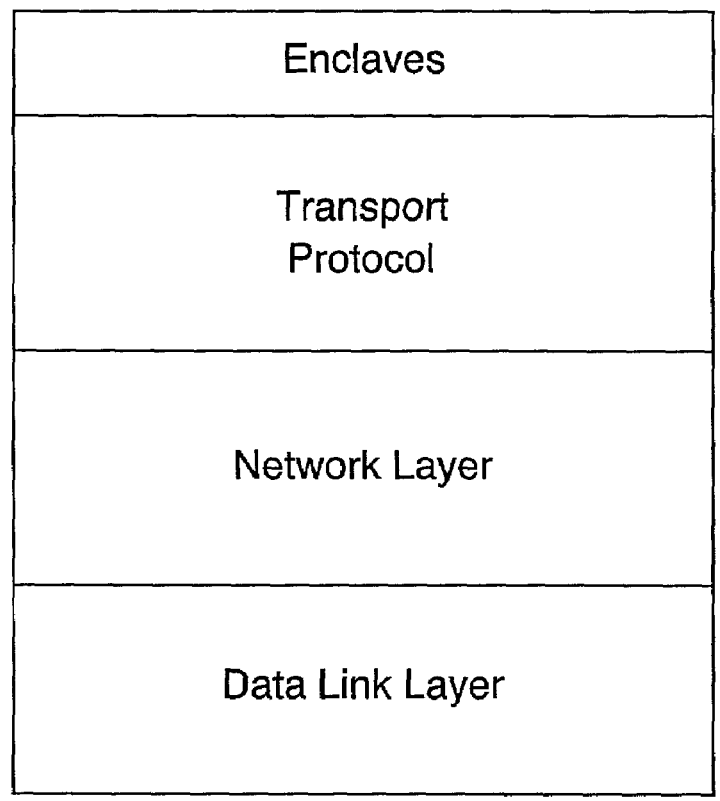
FIG. 5 Manet Layer conceptualization according to present invention
Figure 6:
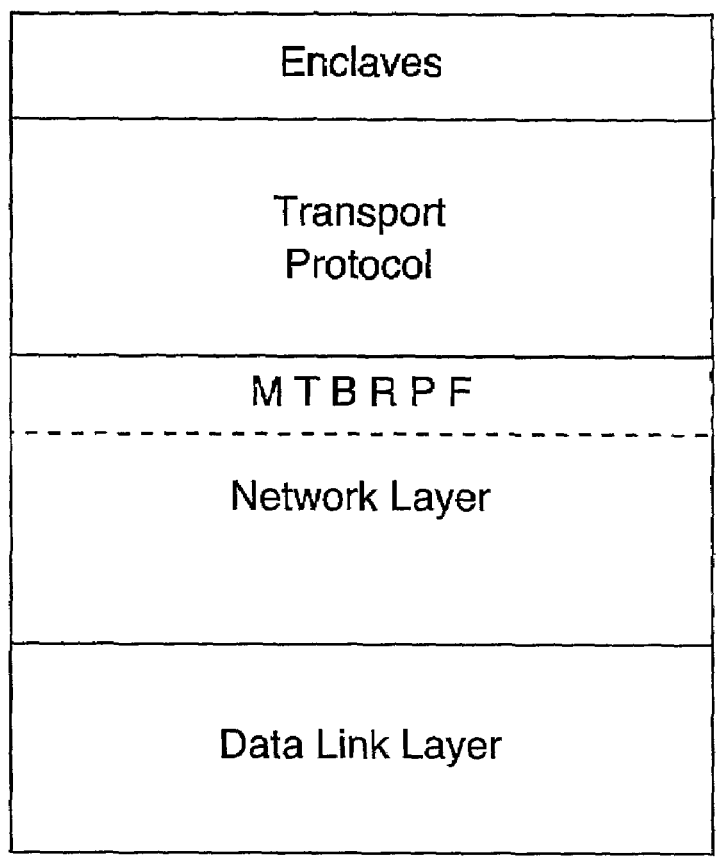
FIG. 6 Manet Layer conceptualization according to present invention

In summary, Enclaves enables users to be authenticated and to join a groupware application. Once in a group, a user A is presented with a group view, that is, the list of all the other group members. The system is intended to satisfy the following security requirements:

a) Proper authentication and access control: Only authorized users can join the application and an authorized user cannot be prevented from joining the application.

b) Confidentiality of group communication: Messages from a member A can be read only by the users who were in A's view of the group at the time the message was sent.

c) Integrity of group communication: A group message received by A was sent by a member of A's current view, was not corrupted in transit, and is not a duplicate. FIGS. 4, A through E inclusive, depict TBRPF and the original Enclaves. FIGS. 5 and 6 depict the conceptual layers of a network system according to the present invention. The invention couples wireless protocol expertise (eg.TBRPF) and authentication protocols and key management.

Centralized Architecture

Figure 1:
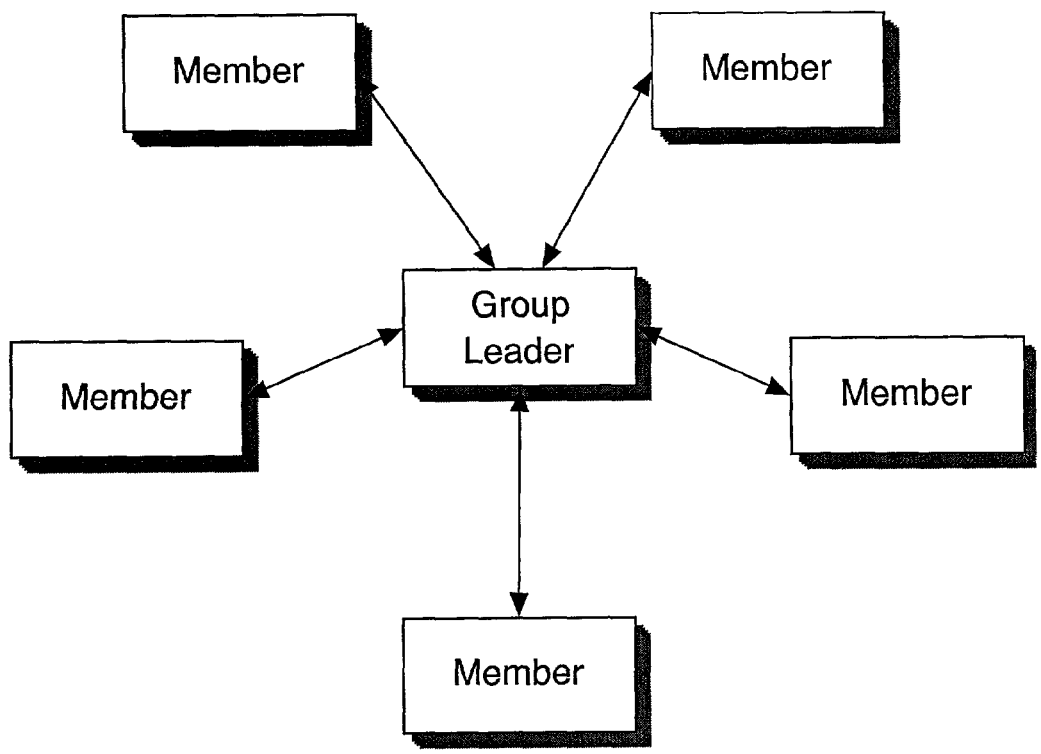
FIG. 1 depicts centralized archives architecture

The original version of Enclaves relies on the centralized architecture shown in FIG. 1. In this architecture, a single group leader is responsible for all group-management activities. The leader is in charge of authenticating and accepting new group members, generating group keys and distributing them to members, and distributing group membership information.

Multi Leader Architecture

Figure 2:
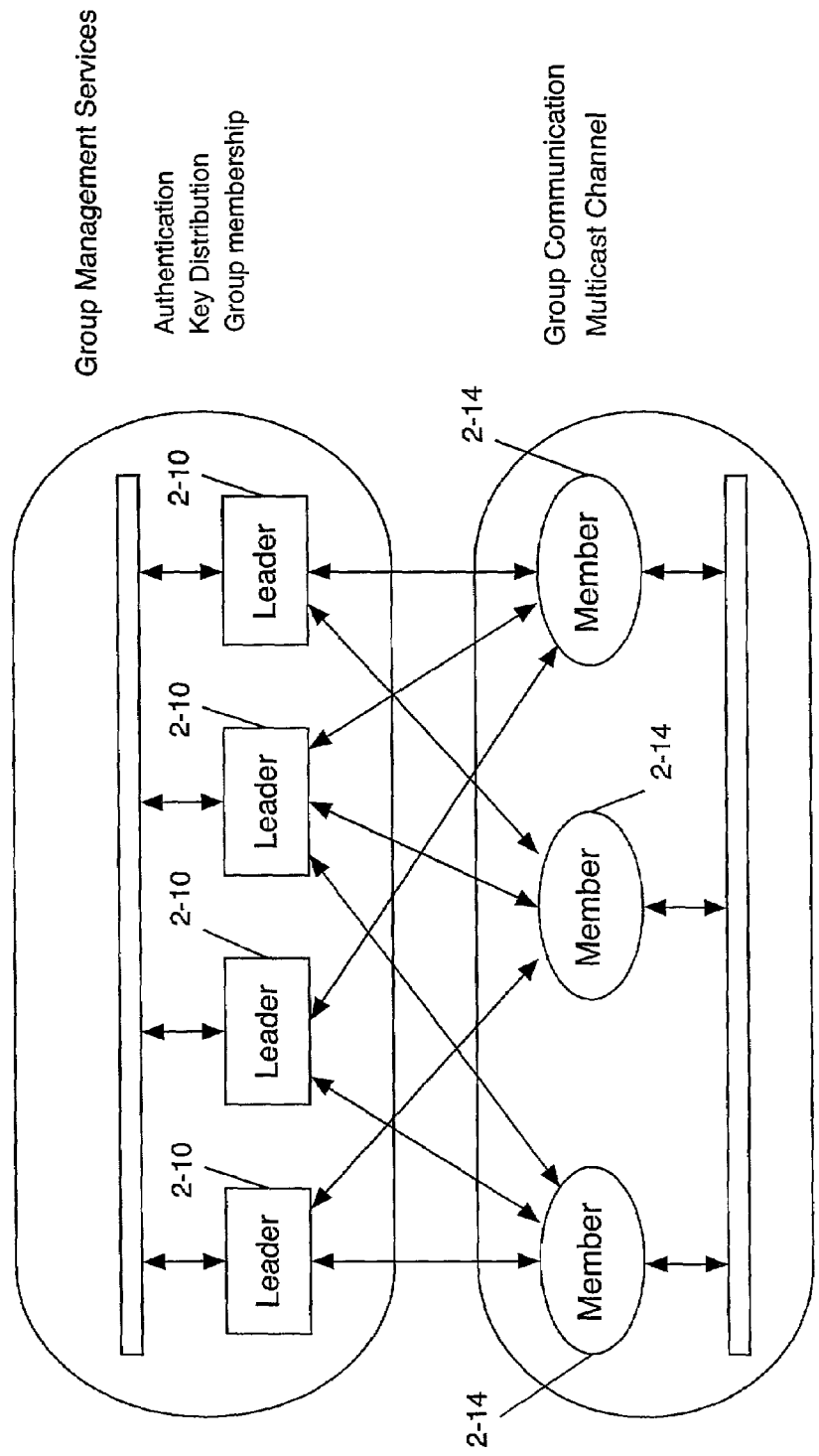
FIG. 2 depicts intrusion tolerant architecture according to the invention

The architecture of the wireless version of Enclaves is shown in FIG. 2. The group and key management functions are distributed across n leaders. The leaders 2-10 communicate with each other and with users via an asynchronous network. Messages sent on this network are assumed to be eventually received, but no assumptions are made on the transmission delays and on the order of reception of messages.

Mobile networks require rapid group association and key deployment. As in previous Enclaves implementations, a common group key is shared by the group members. A new key is generated by the leaders whenever the group changes.

In its dynamic wireless form provided by the invention taught herein, Enclaves can provide a VPN for wireless networks because it removes prespecified leaders and pre-registered users. It decentralizes authentication and join protocols. The authentication is based on certificates and public key cryptography. And the key management protocols are new.

The VPN component is achieved through leveraging VPN technology to create portable, secure, intrusion tolerant, lightweight software infrastructure. Such an infrastructure is based upon fault-tolerant algorithms and cryptography. Groups are managed by predefined sets of leaders.

The dynamic aspect is accomplished by removing the requirement of predefined leaders so that the network is dynamically reconfigurable for increased security and intrusion tolerance. The deployment on ad-hoc wireless networks increases the dynamic character. Organizing groups in clusters serves to further compartmentalize communication and also conserves bandwidth.

Wireless Enclaves also includes protocols for robust and secure multicast.

The preferred embodiment also includes support for multiple secure groups. Authentication, key management and multicast require collaboration of nodes from different groups. Moreover, group hierarchy and clustering is achieved through communication filtering, adapting organization to dynamic network environment, and changing cluster to reduce communication cost.

Scalability of dynamic enclaves is demonstrable in the protocols set forth and otherwise described herein.

The architecture is designed to tolerate up to f compromised leaders, where $3f+1 \leq n$.

The security requirements are the same as previously, and assume that a fixed list of authorized participants is specified before an application starts. The new objective is now to ensure that these requirements are satisfied even if up to f leaders are compromised.

For proper group management, any modification of the group composition requires agreement between the non-faulty leaders. These leaders must agree before accepting a new member or determining that an existing member has left. Ideally, one would like all nonfaulty leaders to maintain agreement on the group composition. Unfortunately, this requires solving a consensus problem, in an asynchronous network, under Byzantine faults. As is well known, there are no deterministic algorithms for solving this problem. Randomized algorithms or algorithms relying on failure detectors could be applicable, but these algorithms tend to be complex and expensive. Instead, a weaker form of consistency property is sufficient for satisfying Enclave's security requirements. The algorithm used in this embodiment is similar to consistent broadcast protocols. Combined with an appropriate authentication procedure, this algorithm ensures that any authorized user who requests to join the group will eventually be accepted. Unlike Byzantine agreement, this algorithm does not guarantee that users are accepted in the same order by all leaders. However, this does not lead to a violation of the confidentiality or integrity properties. If the group becomes stable, all non-faulty leaders eventually reach a consistent view of the group.

As in previous Enclaves implementations, a common group key is shared by the group members. A new key is generated by the leaders whenever the group changes. The difficulty is to generate and distribute this key in an intrusion-tolerant fashion. All group members must obtain the same valid group key, despite the presence of faulty leaders. The attacker must not be able to obtain the group key even with the help of f faulty leaders. These two requirements are satisfied by using a secret sharing scheme proposed by Cachin et al. In the Enclaves framework, this scheme is used by leaders to independently generate and send individual shares of the group key to group members. The protocol is configured so that f+1 shares are necessary for reconstructing the key. A share is accompanied with a description of the group to which it corresponds and a "proof of correctness" that is computationally hard to counterfeit. This allows group members to obtain strong evidence that a share is valid, and prevents faulty leaders from disrupting group communication by sending invalid shares.

To join an application, a user A must contact 2f+1 leaders. Once in the group, A remains connected to these leaders and receives key and group update messages from them. A majority of consistent messages (i.e., f+1) must be received before A takes any action. For example, A changes its current group key only after receiving at least f+1 valid key shares from distinct leaders, and checking that these shares correspond to the same group description. This ensures A that the new group key is valid and that at least one share came from a nonfaulty leader.

Intrusion tolerance in Enclaves relies then on the combination of a cryptographic authentication protocol, a Byzantine fault-tolerant leader-coordination algorithm, and a secret sharing scheme. These protocols are presented in greater detail in the section that follows.

Preferred Embodiment

Enclaves according to the invention taught herein—that can provide secure dynamic multicast groups on mobile wireless networks—is currently implemented in Java, using Sun Microsystems' Java 2 SDK 1.3.1 and the Cryptix 3.2 cryptographic libraries. (See http://www.cryptix.org) The source consists of around 9,000 lines of code in approximately 100 classes.

Figure 3:
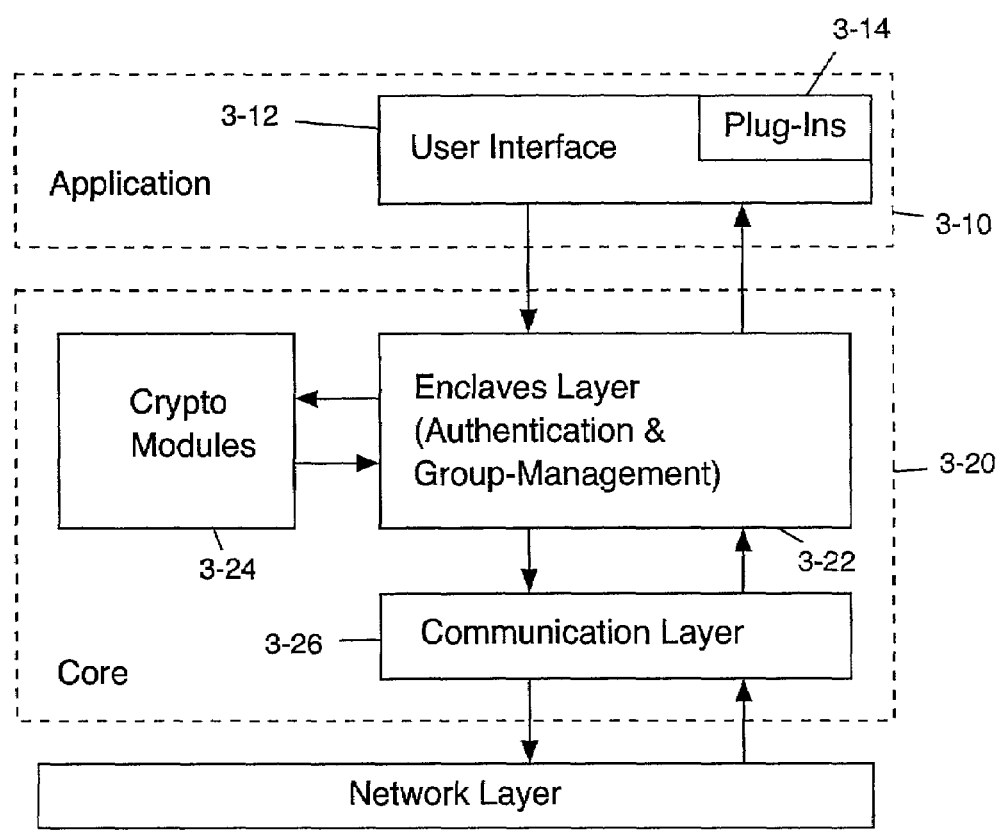
FIG. 3 depicts main software modules according to the invention
Figure 4A:
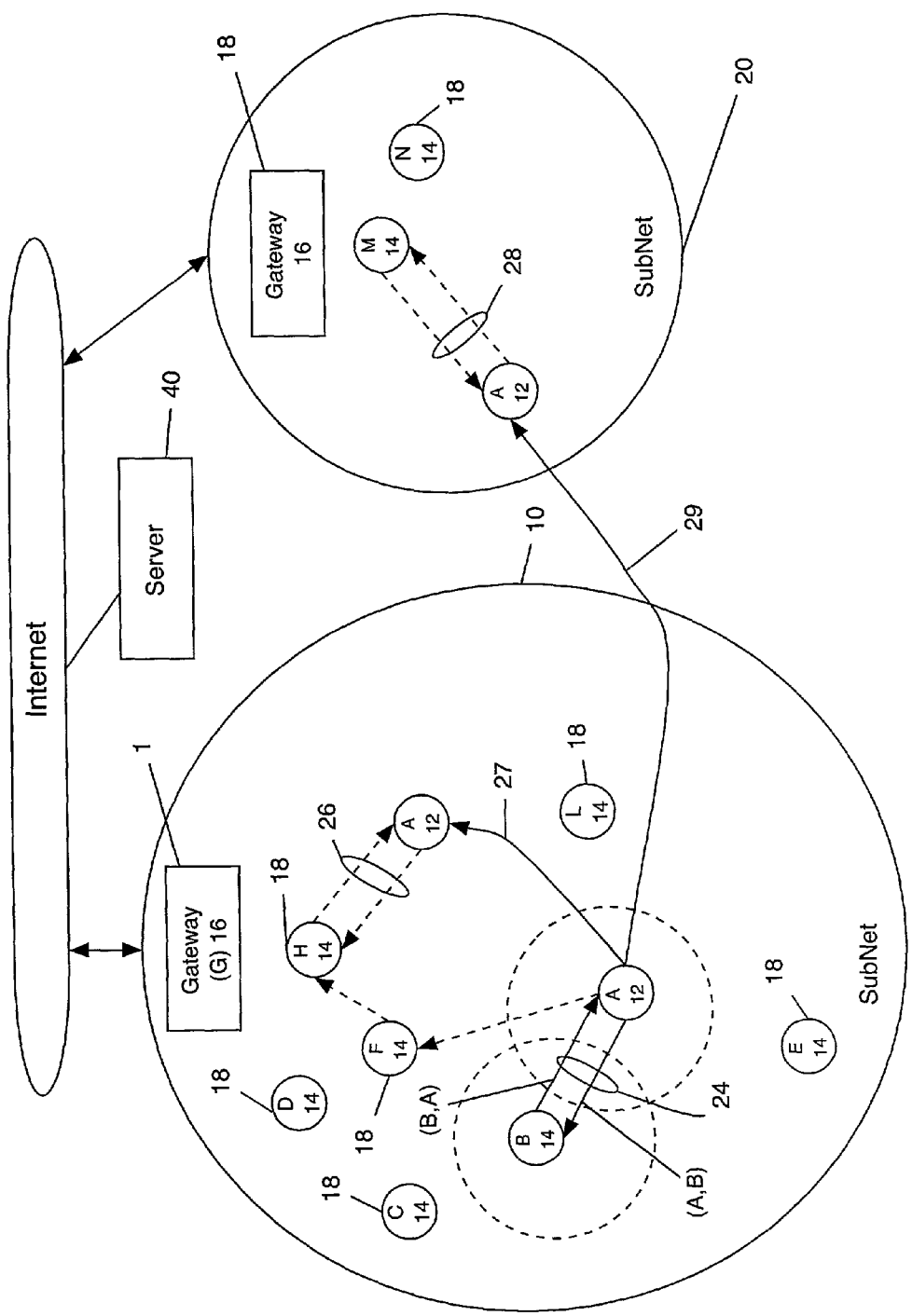
FIG. 4 Appendix A (A through E inclusive) depict TBRPF/Manet/Enclave
Figure 4B:
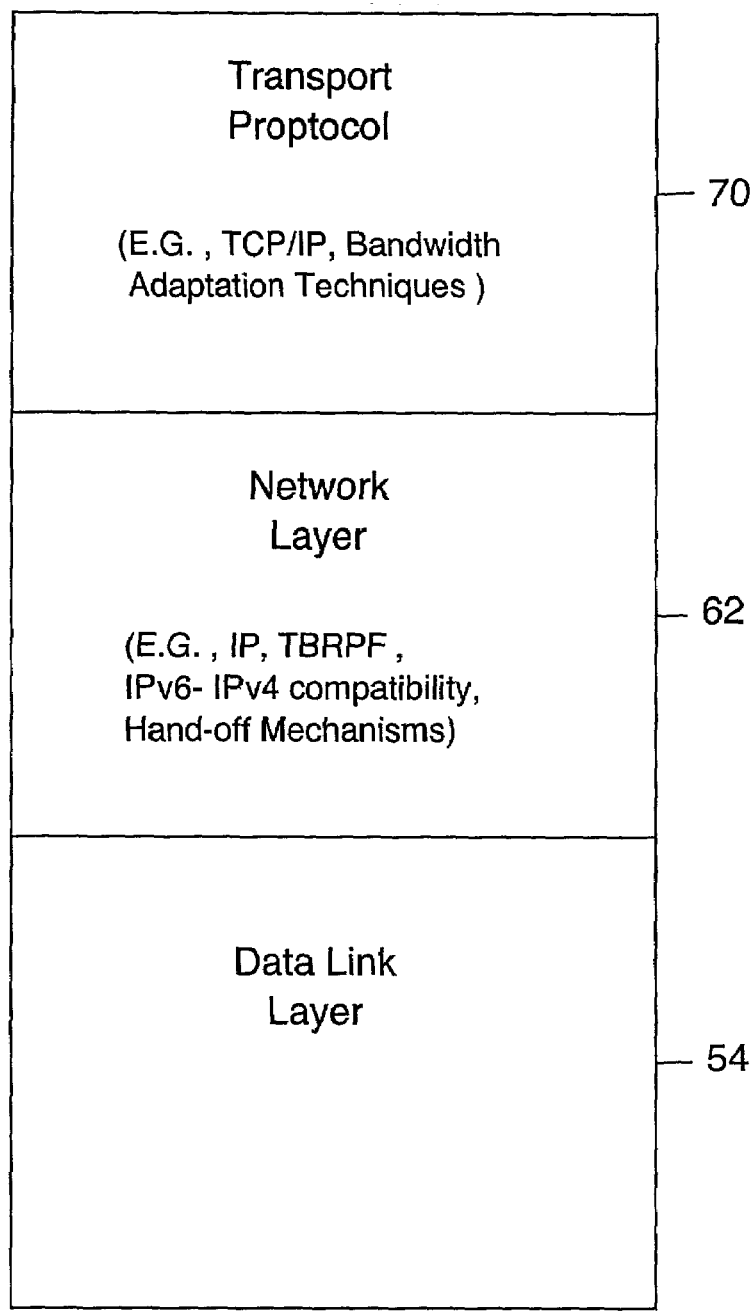
Figure 4C:
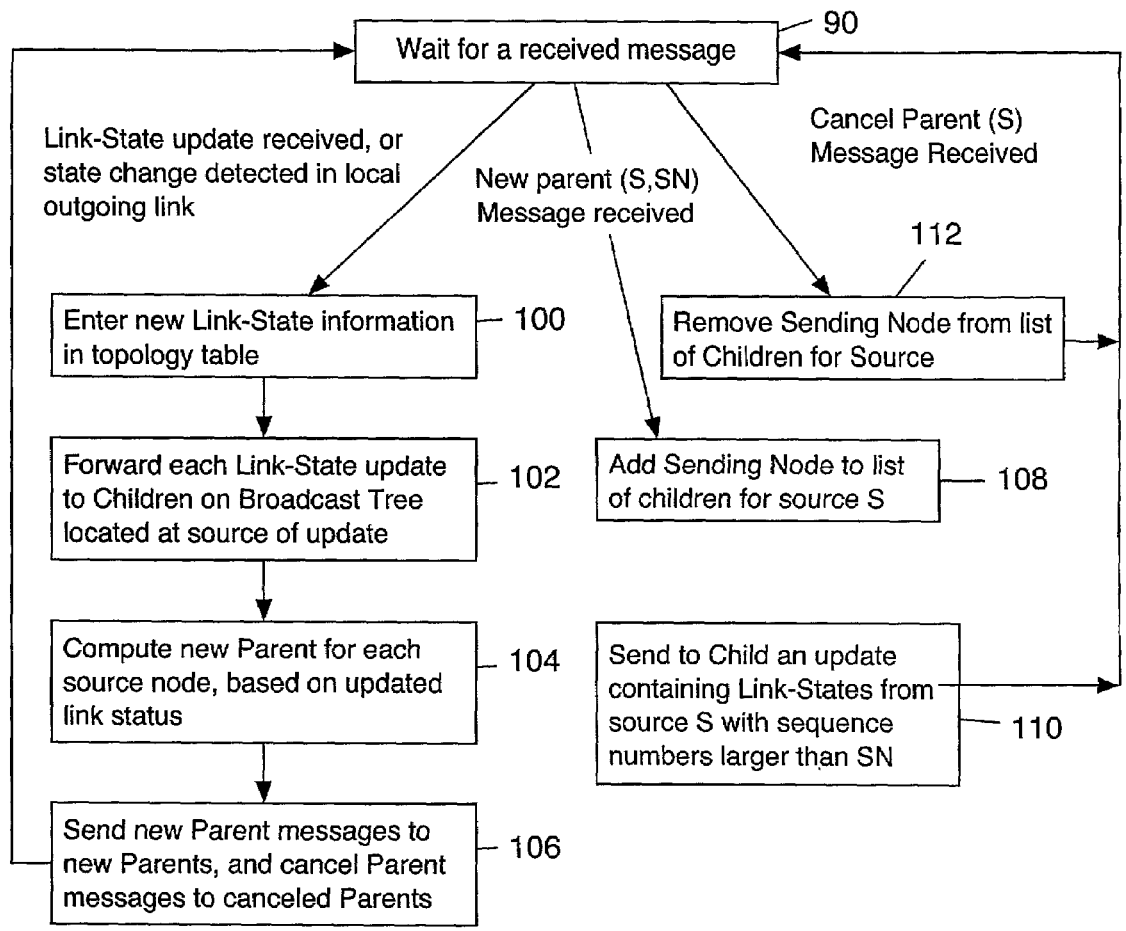
Figure 4D:
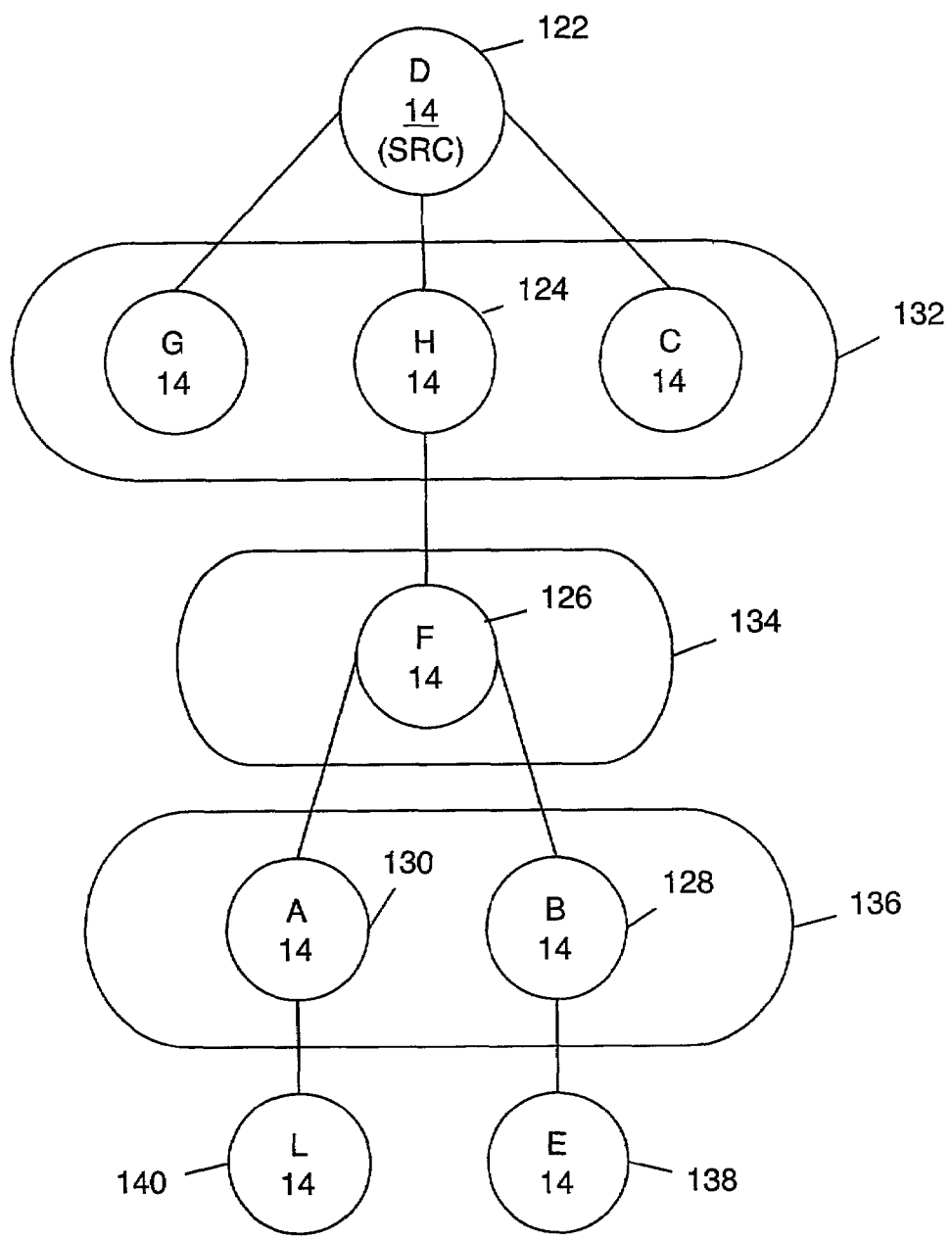
Figure 4E:
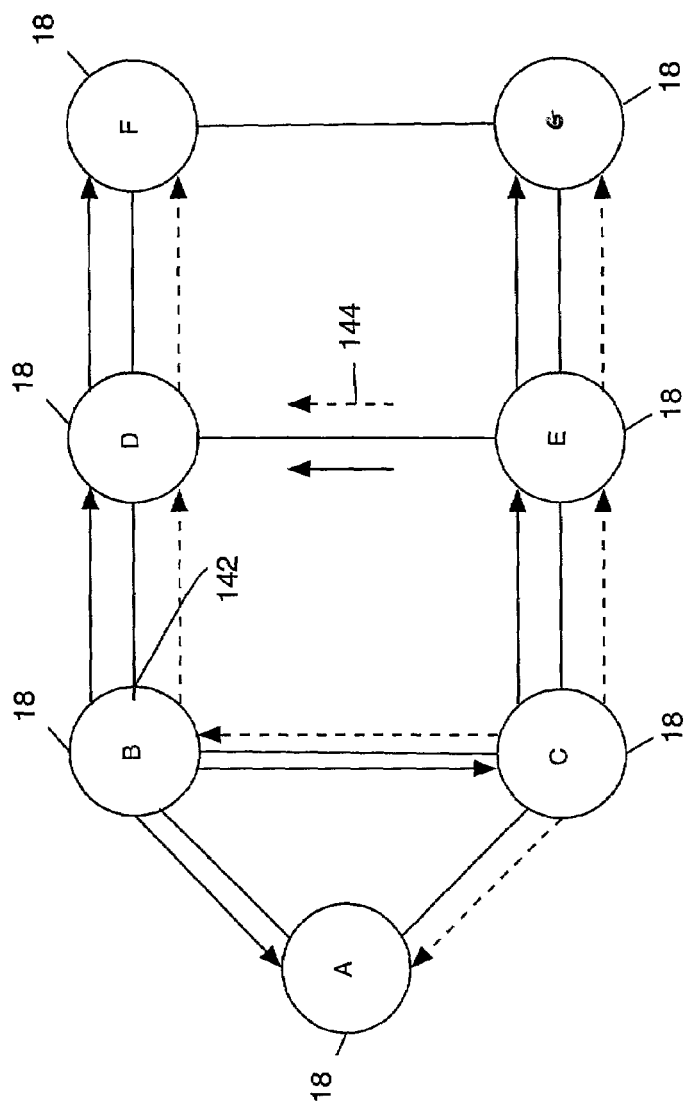

The software is organized in two main modules as depicted in FIG. 3. A set of classes implements the core Enclaves functionalities, namely, the authentication 3-, group management, and key-management functions described previously. On top of this basis, a user interface 3-12 is available that can be customized to support diverse applications. The interface allows users to authenticate and log in to an Enclaves group and displays status information, including the list of members. Applications can be easily incorporated into this interface via a "plugin" mechanism 3-14.

Core Enclaves

The core classes implement the protocols and algorithms described previously. These classes are organized in an Enclaves layer responsible for authentication and group management services, a cryptographic module, and a communication layer that interface with Java networking functions. In a current embodiment, group communication (between group members) as well as communication between leaders is implemented using IP multicast. Leader-to-client connections rely on TCP.

The preferred embodiment of Enclaves uses Cryptix 3.2 as a cryptographic module, but other providers complying with the Java Security Architecture can be used. Enclaves uses a symmetric-key encryption algorithm (currently triple DES), a digital signature algorithm (DSA), and secure hashing algorithm (SHA). These can be easily replaced by other algorithms with similar functionality.

Plugins

Enclaves provides a simple user interface that can be customized for various applications via the use of "plugins". The plugins are loaded on startup and executed as the user requires. This architecture allows several applications to coexist and run concurrently in the same Enclaves group. The underlying support classes transparently encrypt all application messages and distribute them to all group members. Conversely, messages received from the group are decrypted and dispatched to the relevant plugin.

Protocols

The protocols currently used in the preferred embodiment are set forth. While there is a strong emphasis on intrusion tolerance as a feature, notwithstanding, the characteristics of the preferred embodiment should not be interpreted as limitations on the invention as taught herein.

Authentication

To join the group, a user A must first initiate an authentication protocol with 2f+1 distinct leaders. A is accepted as a new group member if it is correctly authenticated by at least f+1 leaders. This ensures that f faulty leaders cannot prevent an honest user from joining the group, and conversely that f faulty leaders cannot allow an unauthorized user to join the group.

For authentication purposes, all users registered as authorized participants in an application share a long-term secret key with each leader. If $L_t$ is one of the leaders, A has a long-term key $P_{\alpha,t}$ that is known by $L_t$ and A. In the current implementation, $P_{\alpha,t}$ is computed from A and $L_t$'s identities, and A's password by applying a one-way hash function. This ensures with high probability that two distinct leaders $L_t$ and $L_j$ do not have the same key for A. Intrusion at a leader $L_t$ can reveal key $P_{\alpha,i}$ to the attacker but does not reveal A's password or $P_{\alpha,j}$. Thus, access to up to f long-term keys $P_{\alpha,t}$ does not enable an attacker to impersonate A.

The following protocol is used by A to authenticate with $L_t$

1. A→$L_i$: AuthInitReq, A, $L_t$, {A, $L_i$, $N_1$}$P_{\alpha,i}$,
2. $L_t$→A: AuthKeyDist, $L_i$, A, {$L_i$, A, $N^1$, $N_2$, Ka,i}$P_{\alpha,i}$
3. A→$L_1$: AuthAckKey, A, $L_t$, {$N_2$, $N_3$}$K_{\alpha,t}$ As a result of this exchange, A is in possession of a session key $K_{\alpha,i}$ that has been generated by $L_i$. All group management messages from $L_t$ to A are encrypted with $K_{\alpha,i}$. Thus, a secure channel is set up between A and $L_i$ that ensures confidentiality and integrity of all group-management messages from $L_t$, to A. Nonces and acknowledgments protect against replay. The key $K_{\alpha,i}$ is in use until A leaves the group. A fresh session key will be generated if A later rejoins the group.

Leader Coordination

If a non-faulty leader $L_t$ successfully authenticates A, $L_t$ does not immediately add A as a new group member. Instead, the leader coordination algorithm described in FIG. 3 is executed. A similar algorithm is used to coordinate leaders when a member leaves the group.

Leader $L_t$ runs the following protocol
After successful authentication of A,
$L_i$ sends (Propose,j, A, $n_j$)$_{\alpha j}$ to all leaders
After receiving f+1 valid (Propose, j, A, $n_j$)$_{\alpha j}$ from different leaders, $L_i$ sends (Propose, i, A, ni)$_{o,1}$ to all leaders if it has not already done so When Li receives n−f valid (Propose, j, A, $n_j$)$_{\alpha j}$ from n−f distinct leaders, $L_t$ accepts A as a new member Leader Coordination Protocol The notation ( . . . )$_{\alpha t}$ denotes a message digitally signed by $L_i$. The constant $n_t$ is used to protect against replay attacks. Each leader maintains a local integer variable $n_i$ and its local view $M_i$ of the current group members. $M_i$ is updated and $n_i$ is incremented every time $L_t$ accepts a new member or removes an existing member. The message (Propose, A, $n_j$), is considered valid by $L_i$ if the signature checks, if $n_j \geq n_i$, and if A is not a member of $M_i$. The pair ($n_t$, $M_t$) is $L_t$'s current view of the group. In FIG. 3, $L_t$ must include its own (Propose . . . ) message among the n−f messages necessary before accepting A.

This algorithm is a variant of existing consistent broadcast algorithms. It satisfies the following properties as long as no more than f leaders are faulty:

Consistency: If one non-faulty leader accepts A then all non-faulty leaders eventually accept A.
Liveness: If f+1 non-faulty leaders announce A, then A is eventually accepted by all non-faulty leaders.
Valid Authentication: If one non-faulty leader accepts A then A has been announced, and thus authenticated, by at least one non-faulty leader.

The last property prevents the attacker from introducing unauthorized users into the group. Conversely, if A is an authorized user and correctly executes the authentication protocol, A will be announced by f+1 non-faulty leaders, and thus will eventually be accepted as a new member by all non-faulty leaders.

The protocol works in an asynchronous network model where transmission delays are unbounded. It does not ensure that all non-faulty leaders always have a consistent group view. Two leaders $L_i$ and $L_j$ may have different sets $M_i$ and $M_j$ for the same view number $n_t=n_j$. This happens if several users join or leave the group concurrently, and their requests and the associated Propose messages are received in different orders by $L_t$ and $L_j$. If the group becomes stable, that is, no requests for join or leave are generated in a long interval, then all non-faulty leaders eventually converge to a consistent view. They communicate this view and the associated group-key shares to all their clients who all also eventually have a consistent view of the group and the same group key.

Temporary disagreement on the group view may cause non-faulty leaders to send valid but inconsistent group-key shares to some members. This does not compromise the security requirements of Enclaves but may delay the distribution of a new group key.

Group-Key Management

The group-key management protocol relies on secure secret sharing. Each of the n leaders knows only a share of the group key, and at least f+1 shares are required to reconstruct the key. Any set of no more than f shares is insufficient. This ensures that compromise of at most f leaders does not reveal the group key to the attacker. In most secret sharing schemes, n shares $s_i$, . . . , $s_n$, are computed from a secret s and distributed to n shareholders. The shares are computed by a trusted dealer who needs to know s. In Enclaves, a new secret s and new shares must be generated whenever the group changes. This must be done online and without a dealer, to avoid a single point of failure. A further difficulty is that some of the parties involved in the share renewal process may be compromised.

A solution to these problems was devised by Cachin et al. In their protocol, the n shareholders can individually compute their share of a common secret s without knowing or learning s. One can compute s from any set of f+1 or more such shares, but f shares or fewer are not sufficient. The shares are all computed from a common value ğ that all shareholders know. In the preferred embodiment context, the shareholders are the group leaders and ğ is derived from the group view using a one-way hash function. Leader $L_i$ computes its share $s_t$ using a share-generation function S, the value j, and a secret $x_i$ that only $L_i$ knows: $s_i$=S(ğ, $x_i$). Leader $L_i$ also gives a proof that $s_1$ is a valid share for ğ. This proof does not reveal information about $x_1$ but enables group members to check that $s_t$ is valid.

The secrecy properties of the protocol rely on the difficulty in computing discrete logarithms in a group of large prime order. Such a group G can be constructed by selecting two large prime numbers p and q such that p=2q+1 and defining G as the unique subgroup of order q in $Z^*_p$. The dealer chooses a generator g of G and performs the following operations:

Select randomly f+1 elements $\alpha_o$, . . . , $\alpha_f$ of $Z_q$.
These coefficients define a polynomial of degree f in $Z_q$ [X]:

$$F=\alpha_{o+\alpha 1}X+ \ldots +\alpha_f X^f$$

Compute $x_1$, . . . $x_n$, of $Z_q$, and $g_1$, $g_n$, of G as follows:

$$x_i=F(i)$$

$$g_i=g^{xi}$$

The numbers $x_1$, . . . , $x_n$, must then be distributed secretly to the n leaders $L_1$, . . . , $L_n$, respectively. The generator g and the elements $g_j$, . . . , $g_n$. are made public. They must be known by all users and leaders.

Any subset of f+1 values among $x_1, \ldots, x_n$ allows one to reconstruct F by interpolation, and then to compute the value $\alpha_o=F(0)$. For example, given $x_1, \ldots, X_{f+1}$, one has $$a_o = \sum_{i=1}^{f+1} b_i x_i,$$

where $b_i$ is obtained from $j=1, \ldots, f+1$ by $$b_i = \frac{\prod_{j \neq i} j}{\prod_{j \neq i} (j-i)}.$$

By this interpolation method, one can compute $\check{g}^{\alpha o}$ for any $\check{g} \in G$ given any subset of f+1 values among $\check{g}^{x1} \ldots \check{g}^{xn}$. For example, from $\check{g}^{x1}, \ldots, \check{g}^{f+1}$, one gets $$\check{g}^{ao} = \prod_{i=1}^{f+1} ((\check{g})^{xi})^{b_i}$$

As discussed previously, leader $L_t$ maintains a local group view $(n_t, M_j)$. $L_i$'s share $s_i$ is a function of the group view, the generator g, and $L_i$'s secret value $x_i$. $L_i$ first computes $\check{g} \in G$ using a one-way hash function HI:

$$\check{g}=H_1, (n_i, M_i).$$

The share $s_i$ is then defined as $$s_i = \check{g}^{xi}.$$

The group key for the view $(n_j, M_j)$ is defined as $$K = H_2(\check{g}^{ao}),$$

where $H_2$ is another hash function from G to $\{0, 1\}^k$ (k is the key length). Using equation (1), a group member can compute $\check{g}^{\alpha o}$ given any subset of f+1 or more shares for the same group view. Under a standard intractability assumption, it is computationally infeasible to compute K knowing fewer than f+1 shares. It is also infeasible for an adversary to predict the values of future group keys K even if the adversary corrupts f leaders and has access to f secret values among $x_1, \ldots X_n$.

Equation (1) allows a group member to compute $\check{g}^{\alpha o}$ and K from f+1 valid shares of the form $s_t = \check{g}^{xi}$. However, a compromised leader $L_t$ could make the computation fail by sending an invalid share $s_t \neq \check{g}^{xt}$. $L_t$ could also cause different members to compute different K's by sending different shares to each. To protect against such attacks, the share $s_i$ is accompanied with a proof of validity. This extra information enables a member to check that $s_t$ is equal to $\check{g}^{xi}$ with very high probability. The verification uses the public value $g_1$ that is known to be equal to $g^{x1}$ (since the dealer is trusted). To prove validity without revealing $x_1$, leader $L_i$ generates evidence that $$\log_{\check{g}} s_1 = \log_g g_i.$$

To generate the evidence, $L_t$ randomly chooses a number y in $Z_q$ and computes $$u = g^y$$

$$v = \check{g}^y$$

Then $L_t$ uses a third hash function $H_3$ from $G^6$ to $Z_q$, to compute $$C = H_3(g, g_i, u, \check{g}, s_i, v)$$

$$z = y + x_i c.$$

The proof that $s_1$ is a valid share for $\check{g}$ the pair (c, z). The information sent by $L_t$ to a group member A is then the tuple $$(n_j, M_1, s_i, c, z).$$

This message is sent via the secure channel established between A and $L_i$ after authentication. This prevents an attacker in control of f leaders from obtaining extra shares by eavesdropping on communications between leaders and clients.

On receiving the above message, a group member A evaluates $\check{g} = H_1, (n_t, M_t)$ and $$u^1 = g^z/g^c,$$

$$v^1 = \check{g}^z/s^c_i.$$

A accepts the share as valid if the following equation holds:

$$c = H_3(g, g_i, u^1, \check{g}s_i, v^1) -$$

If this check fails, $s_t$ is not a valid share and A ignores it. Once A receives f+1 valid shares corresponding to the same group view, A can construct the group key. Since A maintains a connection with at least f+1 honest leaders, A eventually receives at least f+1 valid shares for the same view, once the group becomes stable.

It has been proven computationally infeasible, in the random oracle model, for a compromised leader $L_i$ to produce an invalid share s' and two values c and z that pass the share-verification check.

Cryptographic Material

The following cryptographic keys and secret material must be distributed to the leaders and registered users:

Each leader $L_t$ must own a private key to sign messages when executing the leader-coordination protocol. The corresponding public key must be known by all the other leaders.

$L_i$ must also hold the secret xi used to generate shares of group keys. The corresponding verification key gi must be known by all the registered users.

For every registered user A and leader $L_i$, a secret long-term key $P_{\alpha,t}$ is shared by A and $L_i$. This key is used for authentication.

Communication between an application and the underlying Enclaves layer must follow the interface described hereinabove. A plugin simply needs to implement the three methods of abstract class PlugIn Method buildGUI public abstract class PlugIn
    extends Jframe implements . . . {
    protected abstract void buildGUI();
    protected abstract void receiveMessage(Message m);
    protected abstracted void sendMessage (byte[]msg);

is invoked by the user interface for the application to initialize. Afterwards, communication between the application and the Enclaves middleware is performed via two methods for sending and receiving messages. When a plugin is ready to be deployed, the developer must package it and every resource it needs into a JAR file and put it in a specific directory. The new plugin is then loaded and available to users.

Currently, four basic plugins have been developed for Enclaves: a shared whiteboard application (Paint), a messaging application allowing users to send text messages (Chat), a file transfer application for multicasting data files (FTP plugin), and a Sound plugin for multicast of streaming audio. Notwithstanding the foregoing, the potential for plugins is not intended to be limited by the illustrations provided herein.

Performance

Enclaves's security requirements can be shown to theoretically hold if no more than f leaders are compromised, no group member is compromised, the attacker does not break the cryptographic algorithms, and the network assumptions are satisfied. The cryptographic and secret sharing protocols used are hard to break. If weaknesses are discovered, the Enclaves implementation makes it easy to change cryptographic primitives.

As in any group-communication system, if an attacker can compromise a member machine and get hold of the group key, or if one member is non-trustworthy, then confidentiality is lost. Clearly, there is no absolute defense against this vulnerability as it is the function of the system to distribute data to all group members. Mitigating measures could be implemented, such as requiring members to periodically re-authenticate before sending them a new key, or relying on intrusion detection and expel members suspected of being compromised.

Current TCP/IP protocols make it difficult to defend against network-based denial-of-service attacks based on flooding in any system. However, the distributed architecture of Enclaves increases the resilience of the system to such attacks. A useful property is also that group communication can continue even after a successful denial-of-service attack on the leaders. Such an attack prevents new users from joining an application and the group key from being refreshed but does not immediately affect the users already in the group.

Clearly, the architecture of Enclaves improves group security only if it is substantially harder for an attacker to penetrate several leaders than a single one. Every attempt should then be made to prevent common vulnerabilities, so that the same attack does not succeed on all leaders. This requires diversity. Leaders should use different hardware and operating systems, and, as a minimum, different implementations of the Java Virtual Machine. It is also desirable to put the different leaders under the responsibility of different administrators, as a protection against the insider threat.

This invention as described in the specification, drawings and claims is intended to cover all embodiments and equivalence's that occur to a computer science practitioner or those of skill in related fields.

What is claimed is:

1. A mobile communication system, comprising a plurality of leader nodes, each leader having logic contributing to management of a VPN having a plurality of group members, wherein communication between group members are encrypted using a VPN group key, each leader node comprising: authentication logic authenticating VPN group members; acceptance logic coordinating acceptance of group members with other leader nodes; and logic verifying authentication of a mobile station seeking group membership when said mobile station is authenticated by f+1 leader nodes, wherein f is the maximum tolerable number of fault leader nodes and 3f+1 is less than or equal to the total number of leader nodes, and at least 2f+1 leaders received a request to authenticate said mobile station seeking group membership.

2. The system of claim 1 wherein each leader node further comprises:
   a private key to sign communications and a corresponding public key, wherein each leader node knows the public key of each other leader node; and
   a secret used to generate shares of group keys, for which every group member has a corresponding verification.

3. The system of claim 1 wherein each pair of leader nodes and group members share a secret key.

4. The system of claim 1 wherein a leader, L, in response to a request by a mobile station A to become a group member, communicates with all other leaders after authentication of A, and, after receiving n−f validations from distinct leaders, then L accepts A as a group member, where n is the total number of leaders and f is the maximum number of faulty leaders tolerable.

5. The system of claim 1 wherein in response to a group member leaving the group, each leader communicates to each other leader a message indicating that the group member has left the group.

6. the system of claim 1 wherein each leader nodes further comprises: group key sharing logic, generating and distributing shares of the group key wherein each leader knows only a share of the group key, at least f+1 shares are required for a group member to reconstruct the group key, and new shares are generated and distributed by the leaders each time the group membership changes.

7. The system of claim 6 wherein the new shares of the group key are generated online and without a dealer.

\* \* \* \* \*